United States Patent
Hirayama et al.

(10) Patent No.: US 12,281,594 B2
(45) Date of Patent: Apr. 22, 2025

(54) TURBINE BLADE AND GAS TURBINE

(71) Applicant: MITSUBISHI HEAVY INDUSTRIES, LTD., Tokyo (JP)

(72) Inventors: Taku Hirayama, Tokyo (JP); Ryuta Ito, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/708,086

(22) PCT Filed: Nov. 25, 2022

(86) PCT No.: PCT/JP2022/043511
§ 371 (c)(1),
(2) Date: May 7, 2024

(87) PCT Pub. No.: WO2023/106125
PCT Pub. Date: Jun. 15, 2023

(65) Prior Publication Data
US 2024/0426217 A1    Dec. 26, 2024

(30) Foreign Application Priority Data

Dec. 7, 2021  (JP) .................. 2021-198469

(51) Int. Cl.
*F01D 5/18*  (2006.01)
*F01D 5/28*  (2006.01)

(52) U.S. Cl.
CPC .............. *F01D 5/186* (2013.01); *F01D 5/183* (2013.01); *F01D 5/288* (2013.01);
(Continued)

(58) Field of Classification Search
CPC ............... F01D 5/186; F05D 2250/185; F05D 2260/202; F05D 2260/2212
See application file for complete search history.

(56) References Cited

U.S. PATENT DOCUMENTS

| 4,775,296 A | 10/1988 | Schwarzmann et al. |
| 5,695,321 A * | 12/1997 | Kercher .................. F01D 5/187 |
| | | 415/115 |

(Continued)

FOREIGN PATENT DOCUMENTS

| JP | 58-117303 | 7/1983 |
| JP | 9-507550 | 7/1997 |

(Continued)

OTHER PUBLICATIONS

International Search Report issued Dec. 27, 2022 in corresponding International Application No. PCT/JP2022/043511, with English translation.

(Continued)

*Primary Examiner* — Eldon T Brockman
(74) *Attorney, Agent, or Firm* — Wenderoth, Lind & Ponack, L.L.P.

(57) ABSTRACT

A turbine blade includes a blade body, cooling passages extending in the blade height direction inside the blade body and connected to each other via folded portions, and a bypass portion that is provided in a partition wall portion partitioning a pair of adjacent cooling passages and that allows the pair of cooling passages to communicate with each other. The pair of cooling passages includes an upstream passage and a downstream passage. The turbine blade is provided with: a plurality of cooling holes formed in the blade body so as to be arranged along the blade height direction, that communicate with the downstream passage, and open in the surface of the blade body; a plurality of turbulators provided on the inner wall surface of the downstream passage and arranged along the blade height direction; or a thermal barrier coating that covers the surface of the blade body.

8 Claims, 11 Drawing Sheets

(52) U.S. Cl.
CPC .. *F05D 2250/185* (2013.01); *F05D 2260/202* (2013.01); *F05D 2260/2212* (2013.01)

(56) References Cited

U.S. PATENT DOCUMENTS

| | | | | |
|---|---|---|---|---|
| 5,700,132 A * | 12/1997 | Lampes | ............... | F01D 5/187 |
| | | | | 415/115 |
| 9,518,468 B2 * | 12/2016 | Tibbott | ............... | F01D 5/20 |
| 9,995,146 B2 * | 6/2018 | Benson | ............... | F01D 5/18 |
| 2013/0343872 A1 * | 12/2013 | Tibbott | ............... | F01D 5/187 |
| | | | | 415/115 |
| 2017/0234138 A1 | 8/2017 | Bunker | | |

FOREIGN PATENT DOCUMENTS

| | | |
|---|---|---|
| JP | 2010-7463 | 1/2010 |
| JP | 2017-150475 | 8/2017 |
| WO | 96/12874 | 5/1996 |

OTHER PUBLICATIONS

International Preliminary Report on Patentability issued Jun. 20, 2024 in corresponding International Application No. PCT/JP2022/043511, with English translation.

\* cited by examiner

TURBINE BLADE AND GAS TURBINE

TECHNICAL FIELD

The present disclosure relates to a turbine blade and a gas turbine.

The present application claims priority based on Japanese Patent Application No. 2021-198469 filed in Japan on Dec. 7, 2021, the contents of which are incorporated herein by reference.

BACKGROUND ART

In a turbine blade such as a gas turbine, it is known to cool the turbine blade exposed to a high-temperature gas flow or the like by allowing a cooling fluid to flow through serpentine passages (meandering passages) formed inside the turbine blade. In such a turbine blade, cooling holes, turbulators, or the like for effectively cooling the turbine blade with the cooling fluid may be provided, or a thermal barrier coating or the like for preventing heat from being input to the turbine blade may be provided.

For example, PTL 1 discloses a gas turbine blade in which serpentine passages are provided inside a blade body. A trailing edge portion of the turbine blade is provided with a plurality of cooling holes for cooling the trailing edge portion of the turbine blade by using a cooling fluid flowing through the serpentine passages. In addition, a plurality of fins (turbulators) for promoting turbulence of a flow of the cooling fluid in the cooling passage are provided on inner wall surfaces of the cooling passages forming the serpentine passages of the turbine blade.

CITATION LIST

Patent Literature

[PTL 1] PCT Japanese Translation Patent Publication No. 1997-507550
[PTL 2] Japanese Unexamined Patent Application Publication No. 2017-150475

SUMMARY OF INVENTION

Technical Problem

As the cooling fluid flows to a downstream side of the serpentine passages, a temperature of the cooling fluid rises, and the cooling capacity of the cooling fluid decreases. Thus, it has been proposed to provide a bypass portion in the serpentine passages to supply the cooling fluid before the temperature rises to a location where enhanced cooling is desired. By providing the bypass portion in this way, it is possible to supply the cooling fluid having a relatively low temperature to the downstream side of the bypass portion in the serpentine passages. However, a difference in temperature of the cooling fluid before and after the bypass portion becomes large. For this reason, overcooling may occur on the downstream side of the bypass portion, or insufficient cooling may occur on an upstream side of the bypass portion. In a case of overcooling of the turbine blade, the efficiency of using cooling air may decrease, and the efficiency of the entire turbine may decrease. In addition, insufficient cooling of the turbine blade may lead to damage to the turbine blade.

In view of the above circumstances, at least one embodiment of the present invention has an object to provide a turbine blade and a gas turbine capable of preventing overcooling or insufficient cooling of a turbine blade due to provision of a bypass portion in a serpentine passages.

Solution to Problem

According to at least one embodiment of the present invention, there is provided a turbine blade including: a blade body; a plurality of cooling passages that extend along a blade height direction inside the blade body and that are connected to each other via a folded portion; and a bypass portion that is provided in a partition wall portion for partitioning a pair of adjacent cooling passages among the plurality of cooling passages and that allows the pair of cooling passages to communicate with each other, in which the pair of cooling passages include an upstream-side passage and a downstream-side passage located on a downstream side of the upstream-side passage with respect to a flow of a cooling fluid, the turbine blade includes a plurality of cooling holes, a plurality of turbulators, or a thermal barrier coating that covers a surface of the blade body, the plurality of cooling holes being formed in the blade body so as to be arranged along the blade height direction, communicating with the downstream-side passage, and being open to a surface of the blade body, and the plurality of turbulators being provided on an inner wall surface of the downstream-side passage and arranged along the blade height direction, and values of parameters indicating characteristics of the plurality of cooling holes, the plurality of turbulators, or the thermal barrier coating are different between an upstream-side region and a downstream-side region, the upstream-side region being located on an upstream side of a position corresponding to the bypass portion in the blade height direction with respect to the flow of the cooling fluid in the downstream-side passage, and the downstream-side region being located on a downstream side of the upstream-side region with respect to the flow of the cooling fluid in the downstream-side passage.

Further, according to at least one embodiment of the present invention, there is provided a gas turbine including: the turbine blade; and a combustor that generates a combustion gas flowing through a combustion gas passage in which the turbine blade is provided.

Advantageous Effects of Invention

According to at least one embodiment of the present invention, there is provided a turbine blade and a gas turbine capable of preventing overcooling or insufficient cooling of a turbine blade due to provision of a bypass portion in a serpentine passages.

DESCRIPTION OF EMBODIMENTS

Figure 1:
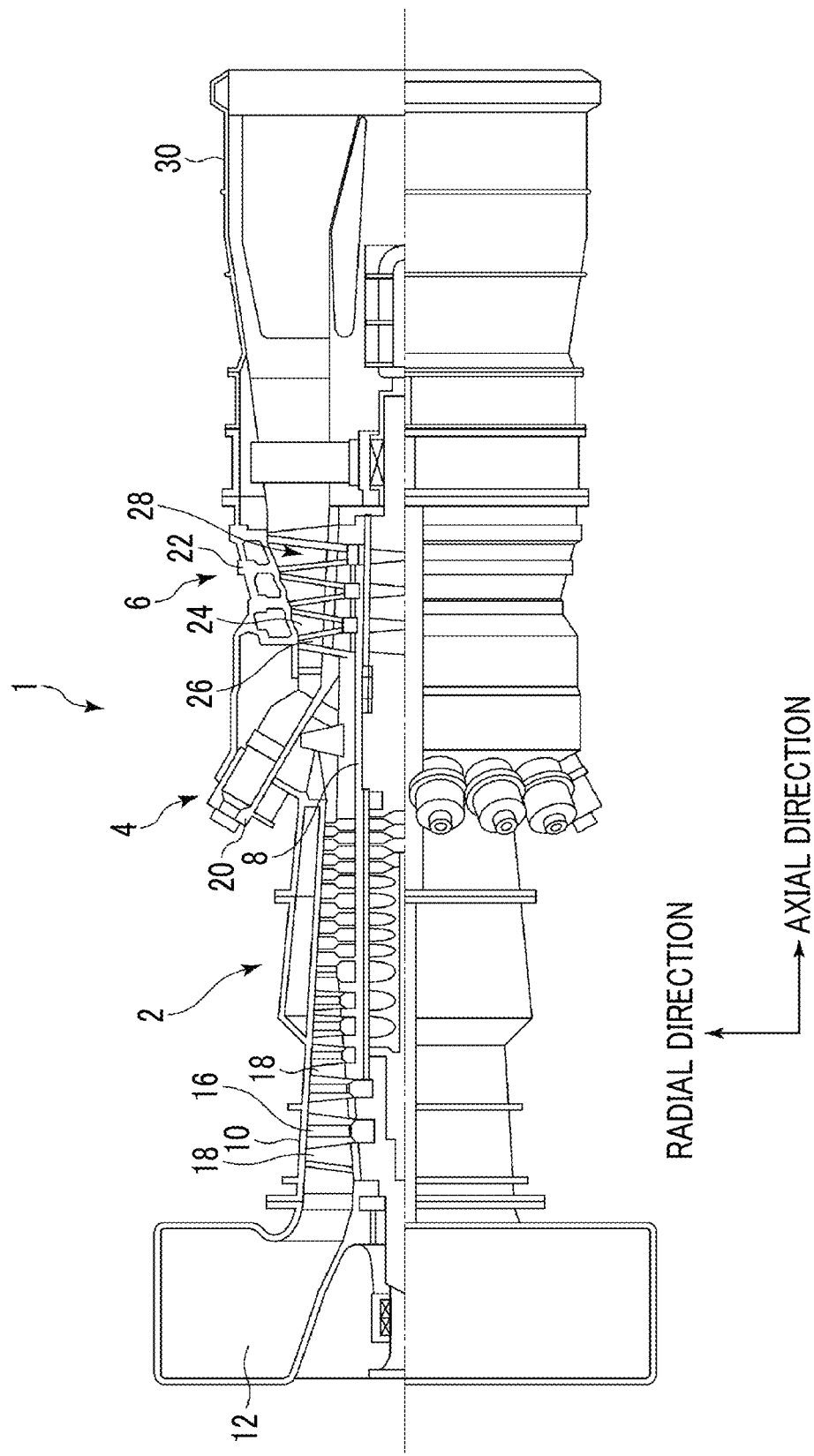
FIG. 1 is a schematic diagram of a gas turbine according to an embodiment.

Hereinafter, some embodiments of the present invention will be described with reference to the accompanying drawings. Dimensions, materials, shapes, relative arrangements, and the like of components described as embodiments or illustrated in the drawings are not intended to limit the scope of the present invention, but are merely explanatory examples.

(Configuration of Gas Turbine)

FIG. 1 is a schematic diagram of a gas turbine as an example of a turbine to which a turbine blade according to some embodiments is applied.

As illustrated in FIG. 1, the gas turbine 1 includes a compressor 2 for generating compressed air, a combustor 4 for generating a combustion gas using compressed air and fuel, and a turbine 6 configured to be rotationally driven by the combustion gas.

As illustrated in FIG. 1, the compressor 2 includes a plurality of stator vanes 16 fixed to a compressor casing 10 side and a plurality of rotor blades 18 implanted on a rotor 8 so as to be alternately arranged with respect to the stator vanes 16. Air taken in from an air intake port 12 is sent to the compressor 2, and the air passes through the plurality of stator vanes 16 and the plurality of rotor blades 18 and is compressed to be high-temperature and high-pressure compressed air.

The fuel and the compressed air generated by the compressor 2 are supplied to the combustor 4, and the fuel is combusted in the combustor 4. Thereby, a combustion gas serving as a working fluid of the turbine 6 is generated. As illustrated in FIG. 1, the gas turbine 1 includes a plurality of combustors 4 disposed in a casing 20 along a circumferential direction around the rotor 8.

The turbine 6 includes a combustion gas passage 28 formed by a turbine casing 22, and includes a plurality of stator vanes 24 and a plurality of rotor blades 26 provided in the combustion gas passage 28. The stator vane 24 is fixed to a turbine casing 22 side, and a stator vane row is configured with a plurality of stator vanes 24 arranged along the circumferential direction of the rotor 8. Further, the rotor blades 26 are implanted on the rotor 8, and a rotor blade row is configured with a plurality of rotor blades 26 arranged along the circumferential direction of the rotor 8. The stator vane row and the rotor blade row are alternately arranged in an axial direction of the rotor 8.

In the turbine 6, the rotor 8 is rotationally driven by causing the combustion gas from the combustor 4 that flows into the combustion gas passage 28 to pass through the plurality of stator vanes 24 and the plurality of rotor blades 26. Note that a generator may be connected to the rotor 8 and the generator may be driven by the turbine 6 to generate electric power. After driving the turbine 6, the combustion gas is discharged to the outside via an exhaust chamber 30.

In some embodiments, at least one of the rotor blades 26 or the stator vanes 24 of the turbine 6 is a turbine blade 40 to be described below. In the following, a description will be given mainly with reference to the drawings in a case where the rotor blade 26 is used as the turbine blade 40. However, essentially the same description can be applied to a case where the stator vane 24 is used as the turbine blade 40.

(Configuration of Turbine Blade)

Figure 2:
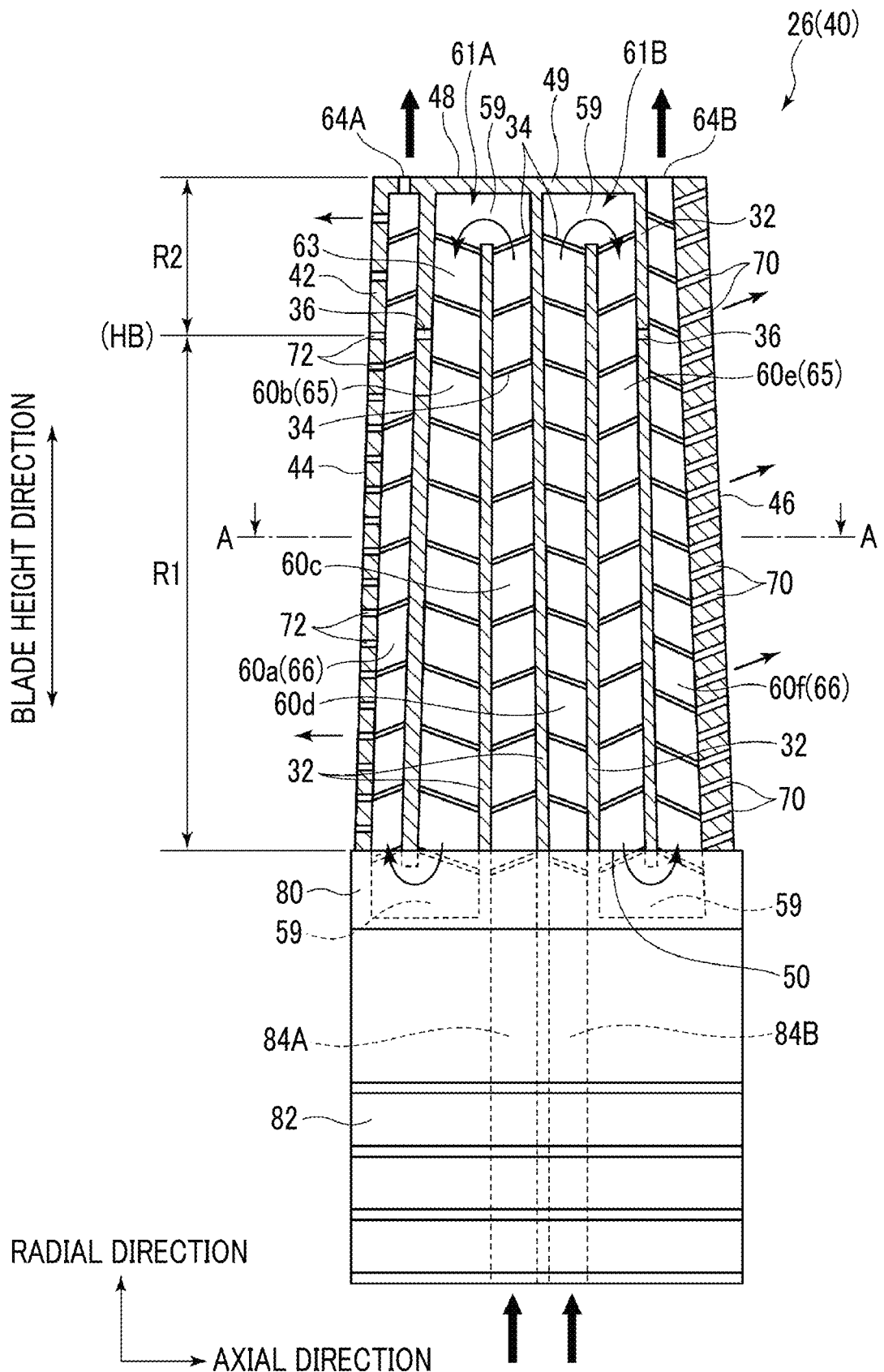
FIG. 2 is a schematic cross-sectional view taken along a blade height direction of a turbine blade according to the embodiment.
Figure 3:
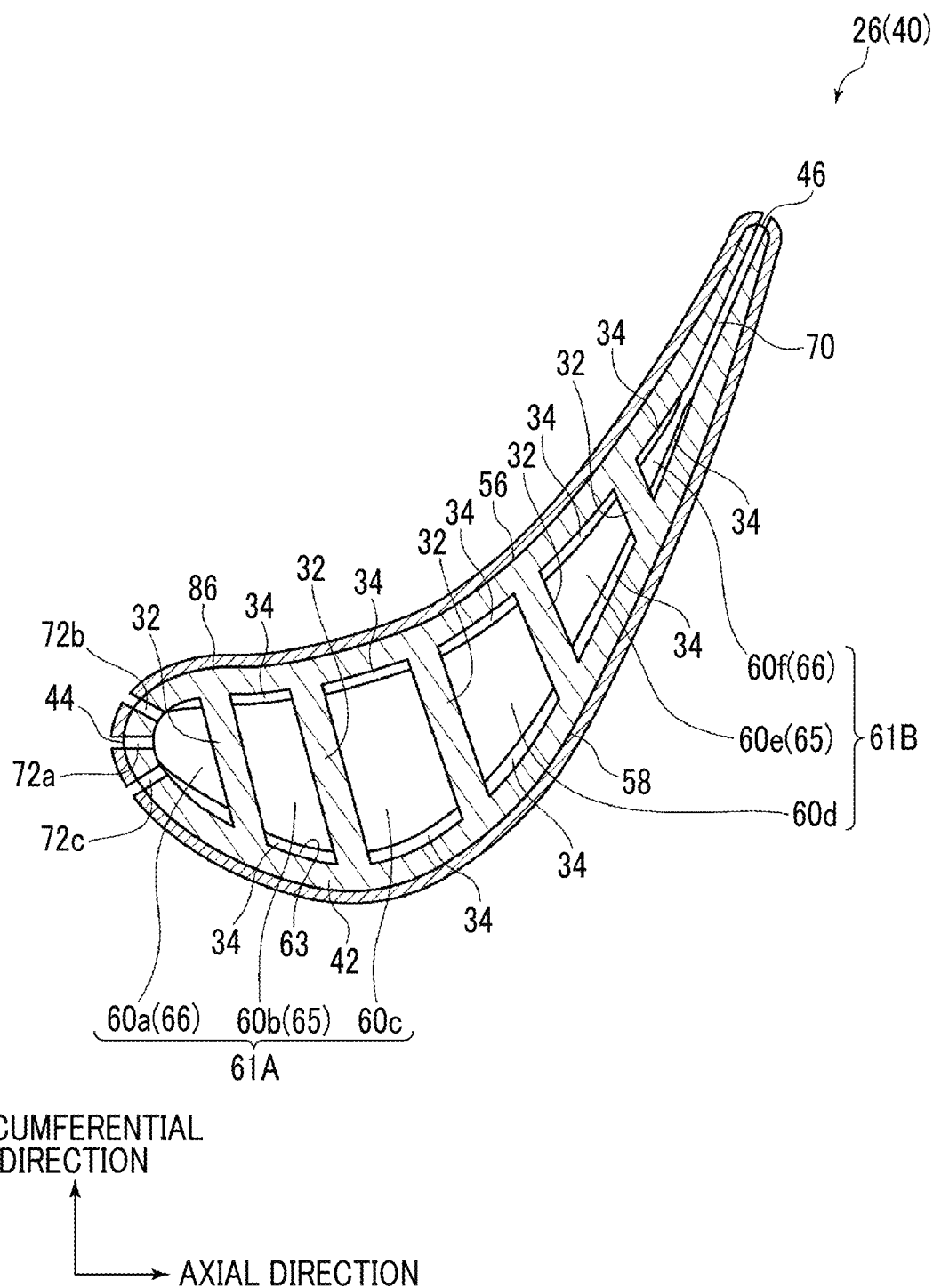
FIG. 3 is a diagram illustrating a cross section taken along a line A-A of the turbine blade of FIG. 2.

FIG. 2 is a schematic cross-sectional view of the turbine blade 40 (the rotor blade 26) according to an embodiment taken along a blade height direction, and FIG. 3 is a diagram illustrating a cross-section of the turbine blade 40 of FIG. 2 taken along a line A-A. An arrow in the drawing indicates a direction of a flow of a cooling fluid. Note that, in FIG. 2, a thermal barrier coating 86 (refer to FIG. 3) is not illustrated.

As illustrated in FIG. 2 and FIG. 3, the turbine blade 40 (the rotor blade 26) according to the embodiment includes a blade body 42, a platform 80, and a blade root portion 82 that is integrally provided with the platform 80 and that is to be embedded in the rotor 8 (refer to FIG. 1).

The blade body 42 is provided to extend along a radial direction of the rotor 8 (hereinafter, may be simply referred to as "radial direction"), has a base end 50 fixed to the platform 80 and a tip end 48 that is located on a side opposite to the base end 50 (outside in the radial direction) in the blade height direction (the radial direction of the rotor 8). The blade body 42 includes a top plate 49 forming a tip-side portion including the tip end 48 of the blade body 42. In addition, the blade body 42 of the rotor blade 26 has a leading edge 44 and a trailing edge 46 extending from the base end 50 to the tip end 48, and a blade surface of the blade body 42 has a pressure surface (ventral surface) 56 and a suction surface (back surface) 58 respectively extending along the blade height direction between the base end 50 and the tip end 48.

As illustrated in FIG. 2 and FIG. 3, a plurality of cooling passages 60a to 60f (hereinafter, collectively referred to as cooling passages 60) extending along the blade height direction are provided inside the blade body 42. In the illustrated embodiment, the cooling passages 60a to 60f are arranged in this order from a leading edge 44 side toward a trailing edge 46 side.

The plurality of cooling passages 60 are connected to each other via folded portions 59 located on a tip end 48 side or a base end 50 side, and serpentine passages (meandering passages) 61 (61A, 61B) are formed. A pair of cooling passages 60 adjacent to each other among the plurality of cooling passages 60 are partitioned by a partition wall portion 32 extending along the blade height direction. The direction of the flow of the cooling fluid flowing through the serpentine passages 61 (61A, 61B) is reversely folded at the folded portions 59 in the blade height direction.

In the exemplary embodiment illustrated in FIG. 2 and FIG. 3, among the cooling passages 60a to 60c, the cooling passage 60a and the cooling passage 60b and the cooling passage 60b and the cooling passage 60c, which are adjacent to each other, are respectively connected to each other via the folded portions 59. These cooling passages 60a to 60c form the serpentine passages 61A on the leading edge side.

Further, in the exemplary embodiment illustrated in FIG. 2 and FIG. 3, among the cooling passages 60d to 60f, the cooling passage 60d and the cooling passage 60e and the cooling passage 60e and the cooling passage 60f, which are adjacent to each other, are respectively connected to each other via the folded portions 59. These cooling passages 60d to 60f form the serpentine passages 61B on the trailing edge side.

A cooling fluid (for example, air) for cooling the turbine blade 40 is supplied to the serpentine passages passages 61 (61A, 61B). In the illustrated embodiment, internal passages cooling passages 84A and 84B are provided inside the blade root portion 82, and the uppermost-side cooling passages 60c and 60d among the plurality of cooling passages 60 forming the serpentine passagespassages 61A and 61B respectively communicate with the above-described internal passagescooling passages 84A and 84B. The cooling fluid from the outside is supplied to the serpentine passagespassages 61A and 61B via the internal passagescooling passages 84A and 84B.

The cooling fluid introduced into the serpentine passages 61A and 61B flows sequentially toward a downstream side through the plurality of cooling passages 60 forming the serpentine passages 61A and 61B. In addition, the cooling fluid, which flows through the lowermost-side cooling passages 60a and 60f among the plurality of cooling passages 60 in a flow direction of the cooling fluid, flows out to the combustion gas passage 28 outside the turbine blade 40 via outlet openings 64A and 64B provided on the tip end 48 side of the blade body 42.

In this way, by supplying the cooling fluid to the serpentine passages 61, the blade body 42 that is provided in the combustion gas passage 28 of the turbine 6 and that is exposed to the high-temperature combustion gas is cooled.

In some embodiments, the turbine blade 40 is formed in the blade body 42 so as to be arranged along the blade height direction, and has a plurality of cooling holes that communicate with the cooling passages 60 and that are open to a surface of the blade body 42.

In the exemplary embodiment illustrated in FIG. 2 and FIG. 3, the turbine blade 40 is formed in the blade body 42 so as to be arranged along the blade height direction, and has a plurality of cooling holes 72 (72a to 72c) that communicate with the cooling passage 60a (downstream-side passage 66 to be described later) located closest to the leading edge side and that are open to a surface of a leading edge portion of the blade body 42.

A portion of the cooling fluid flowing through the cooling passage 60a passes through the cooling holes 72, and flows out to the combustion gas passage 28 outside the turbine blade 40 from an opening of the leading edge portion of the blade body 42. When the cooling fluid that flows out in this manner flows along an outer surface of the turbine blade 40, a film boundary layer (a film-like cooling medium flow) is formed on the outer surface by the cooling fluid. By the film boundary layer, heat transfer (input of heat to the turbine blade 40) from the combustion gas flowing through the combustion gas passage 28 to the blade body 42 is prevented. Further, as the cooling fluid passes through the cooling holes 72, the leading edge portion of the blade body 42 that includes the leading edge 44 is convectively cooled.

Further, in the exemplary embodiment illustrated in FIG. 2 and FIG. 3, the turbine blade 40 is formed in the blade body 42 so as to be arranged along the blade height direction, and has a plurality of cooling holes 70 that communicate with the cooling passage 60f (downstream-side passage 66 to be described later) located closest to the trailing edge side and that are open to a surface of a trailing edge portion of the blade body 42.

A portion of the cooling fluid flowing through the cooling passage 60f passes through the cooling holes 70, and flows out to the combustion gas passage 28 outside the turbine blade 40 from an opening of the trailing edge portion of the blade body 42. In this way, as the cooling fluid passes through the cooling holes 70, the trailing edge portion of the blade body 42 that includes the trailing edge 46 is convectively cooled.

In some embodiments, the turbine blade 40 includes a plurality of turbulators 34 that are provided on inner wall surfaces 63 of the cooling passages 60 and arranged along the blade height direction. In the exemplary embodiment illustrated in FIG. 2 and FIG. 3, a plurality of rib-shaped turbulators 34 protruding from the inner wall surfaces 63 are provided on the inner wall surface 63 of each of the plurality of cooling passages 60.

In a case where the turbulators 34 are provided on the inner wall surfaces 63 of the cooling passages 60, when the cooling fluid flows through the cooling passages 60, a turbulence of the flow such as generation of a vortex is promoted in the vicinity of the turbulators 34. Thereby, cooling of the turbine blade 40 with the cooling fluid flowing through the cooling passages 60 is promoted.

In some embodiments, the turbine blade 40 includes a thermal barrier coating 86 (refer to FIG. 3) that covers the surfaces (the pressure surface 56 and the suction surface 58) of the blade body 42. By the thermal barrier coating 86 provided on the surface of the turbine blade 40, heat transfer (input of heat to the turbine blade 40) from the combustion gas flowing through the combustion gas passage 28 to the blade body 42 is prevented.

The thermal barrier coating 86 may include a ceramic layer that is formed of a ceramic and a bond layer that is provided between the ceramic layer and the blade body 42 and that is formed of an oxide-resistant metal or the like. The thermal barrier coating 86 may be formed by thermal spraying.

In the exemplary embodiment illustrated in FIG. 2 and FIG. 3, the plurality of cooling holes 72 of the leading edge portion, the plurality of cooling holes 70 of the trailing edge portion, the turbulators 34, and the thermal barrier coating 86 are included. However, in some embodiments, the turbine blade 40 may include any one or more of the plurality of cooling holes 72 of the leading edge portion, the plurality of cooling holes 70 of the trailing edge portion, the turbulators 34, or the thermal barrier coating 86.

As illustrated in FIG. 2, in some embodiments, the turbine blade 40 includes a bypass portion 36 that is provided in the partition wall portion 32 for partitioning the upstream-side passage 65 and the downstream-side passage 66 and that allows the upstream-side passage 65 and the downstream-side passage 66 to communicate with each other, the upstream-side passage 65 and the downstream-side passage 66 being a pair of cooling passages 60 adjacent to each other among the plurality of cooling passages 60 forming the serpentine passages 61. Here, the downstream-side passage 66 is the cooling passage 60 located to be adjacent to the upstream-side passage 65 among the plurality of cooling passages 60, and is the cooling passage 60 located on the downstream side of the upstream-side passage 65 with respect to the flow of the cooling fluid flowing through the plurality of cooling passages 60 (the serpentine passages 61). The bypass portion 36 may be a hole or a slit provided in the partition wall portion 32.

In the exemplary embodiment illustrated in FIG. 2, the turbine blade 40 includes a bypass portion 36 that is provided in the partition wall portion 32 for partitioning the cooling passage 60b (upstream-side passage 65) and the cooling passage 60a (downstream-side passage 66), which are adjacent to each other among the plurality of cooling passages 60a to 60c forming the serpentine passages 61A on the leading edge side. The cooling passage 60b (upstream-side passage 65) and the cooling passage 60a (downstream-side passage 66) communicate with each other via the bypass portion 36.

Further, in the exemplary embodiment illustrated in FIG. 2, the turbine blade 40 includes a bypass portion 36 that is provided in the partition wall portion 32 for partitioning the cooling passage 60e (upstream-side passage 65) and the cooling passage 60f (downstream-side passage 66), which are adjacent to each other among the plurality of cooling passages 60d to 60f forming the serpentine passages 61B on the trailing edge side. The cooling passage 60e (upstream-side passage 65) and the cooling passage 60f (downstream-side passage 66) communicate with each other via the bypass portion 36.

In some embodiments, between an upstream-side region R1 and a downstream-side region R2, values of parameters indicating characteristics of the plurality of cooling holes 70 or 72, the plurality of turbulators 34, or the thermal barrier coating 86, or average values of the parameters are different, the upstream-side region R1 being located on the upstream side of a position corresponding to the bypass portion 36 in the blade height direction with respect to the flow of the cooling fluid in the downstream-side passage 66 (the cooling passage 60a or 60f), and the downstream-side region R2 being located on the downstream side of the upstream-side region R1 in the blade height direction with respect to the flow of the cooling fluid in the downstream-side passage 66 (the cooling passage 60a or 60f). Note that an example of the parameters will be described later.

Note that, in exemplary embodiments illustrated in FIG. 2 and FIG. 4 to FIG. 10 to be described later, between the upstream-side region R1 and the downstream-side region R2, the values of the above-described parameters are different, the upstream-side region R1 being located on the upstream side of the position HB of the bypass portion 36 in the blade height direction, and the downstream-side region R2 being located on the downstream side of the position HB of the bypass portion 36 in the blade height direction (that is, a boundary between the upstream-side region R1 and the downstream-side region R2 is the position HB of the bypass portion 36 in the blade height direction). However, for example, as in an embodiment illustrated in FIG. 11 to be described later, the boundary between the upstream-side region R1 and the downstream-side region R2 may deviate from the position HB of the bypass portion 36 in the blade height direction.

In general, a temperature of the cooling fluid supplied to the serpentine passages 61 increases as the cooling fluid flows to the downstream side. As a result, the cooling capacity of the cooling fluid decreases. In this regard, in the turbine blade 40 having the above-described configuration, the upstream-side passage 65 and the downstream-side passage 66 which are adjacent to each other communicate with each other via the bypass portion 36. Thus, the cooling fluid having a relatively low temperature before the temperature rises can be supplied to the region (the downstream-side region R2) on the downstream side of the bypass portion 36 in the downstream-side passage 66. Therefore, the blade body 42 in the vicinity of the downstream-side region R2 can be effectively cooled.

Further, in the turbine blade 40 having the above-described configuration, between the region (upstream-side region R1) on the upstream side of the bypass portion 36 and the region (downstream-side region R2) on the downstream side of the bypass portion 36 in the downstream-side passage 66, the parameters indicating characteristics of the plurality of cooling holes 70 or 72, the plurality of turbulators 34, or the thermal barrier coating 86 are different. Therefore, between the upstream-side region R1 and the downstream-side region R2 in the downstream-side passage 66, it is possible to make a difference in the amount of heat removed from the turbine blade 40 by the cooling fluid or in the amount of heat input to the turbine blade 40 from the gas (the combustion gas or the like) flowing through the combustion gas passage 28 in which the turbine blade 40 is disposed. Therefore, for the blade body 42 in the vicinity of the downstream-side passage 66, it is possible to prevent overcooling in the downstream-side region R2 or insufficient cooling in the upstream-side region R1.

That is, according to the turbine blade 40 having the above-described configuration, by providing the bypass portion 36, the turbine blade 40 can be effectively cooled, and overcooling or insufficient cooling of the turbine blade 40 due to provision of the bypass portion 36 can be prevented.

Figure 4:
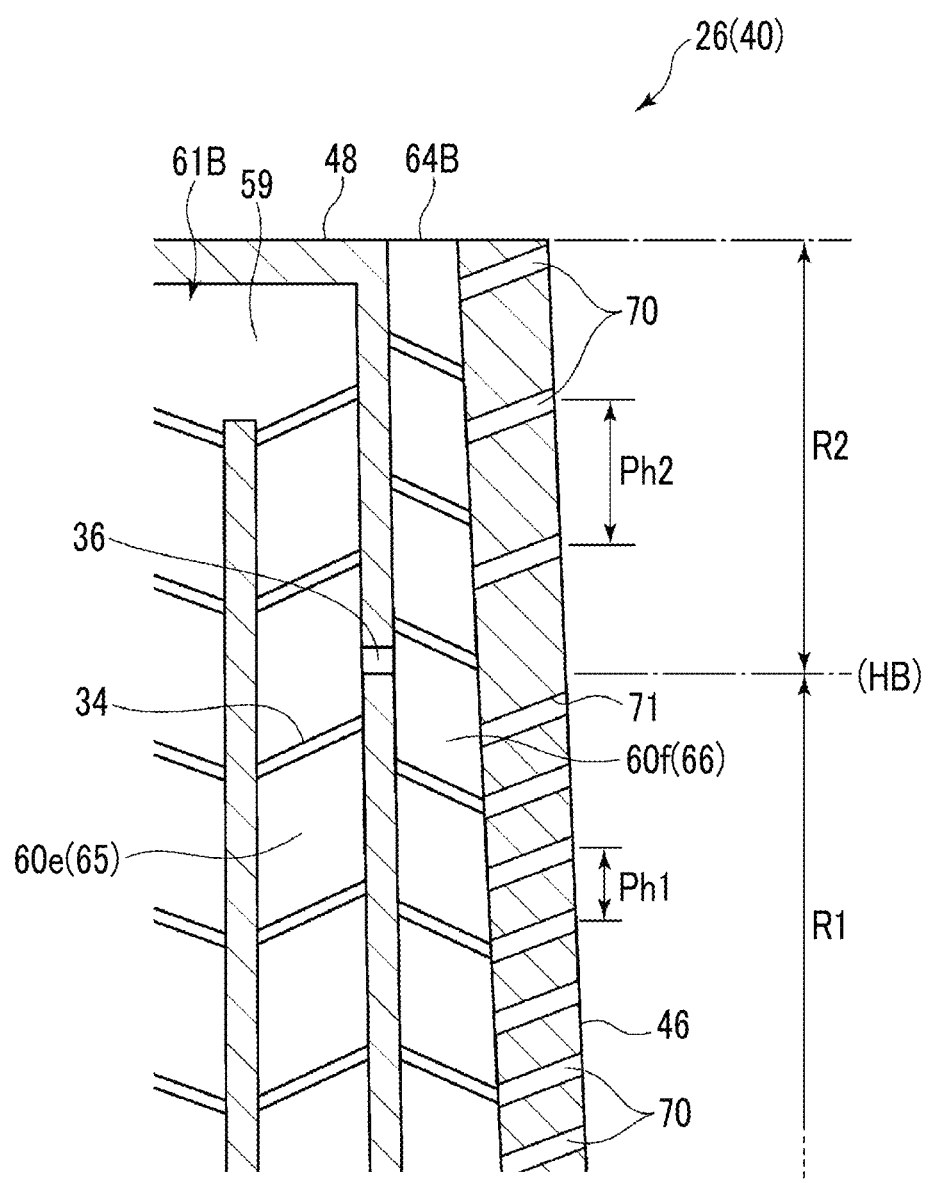
FIG. 4 is a schematic cross-sectional view illustrating an enlarged portion of the turbine blade according to the embodiment on a trailing edge side.
Figure 5:
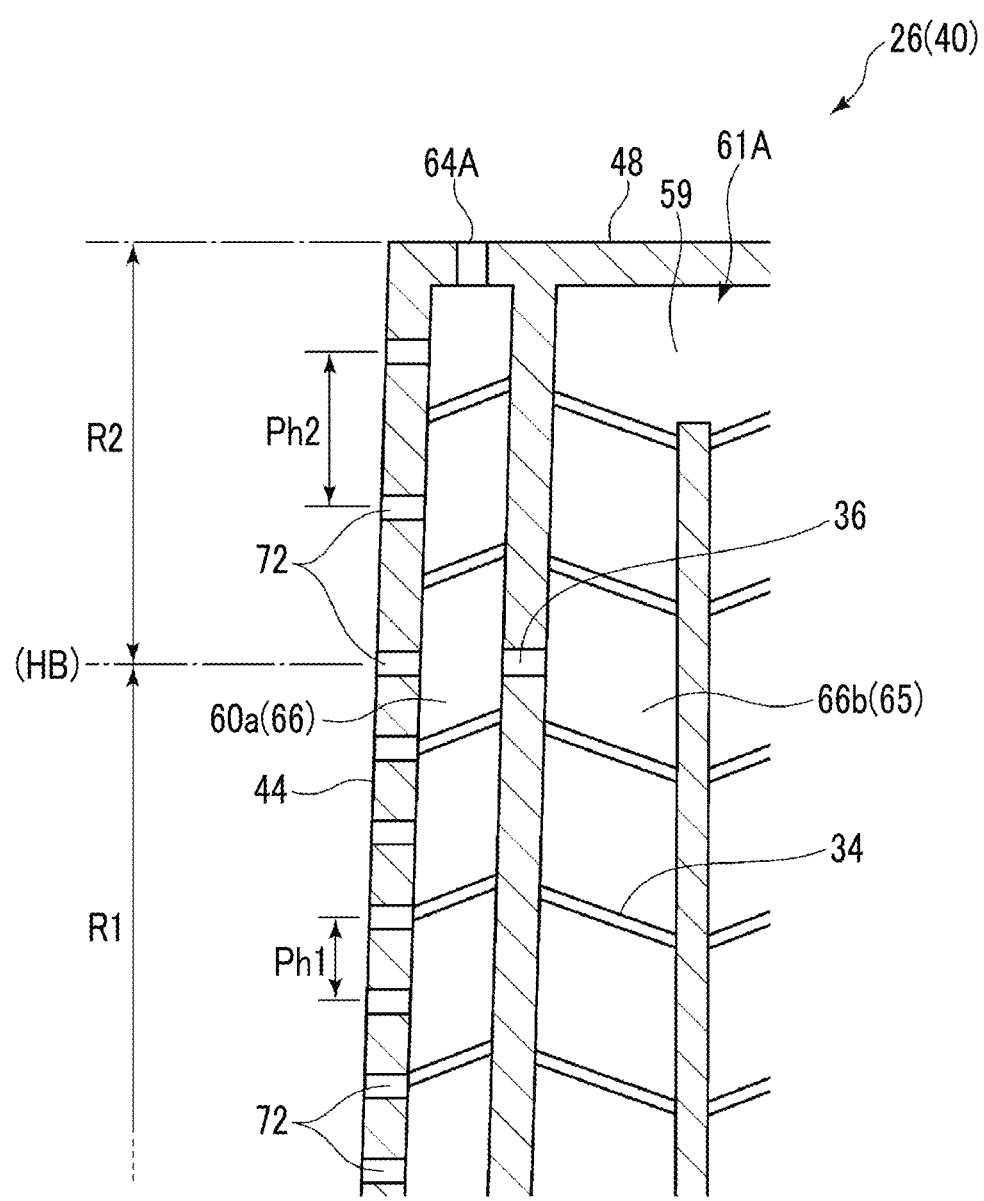
FIG. 5 is a schematic cross-sectional view illustrating an enlarged portion of the turbine blade according to the embodiment on a leading edge side.
Figure 10:
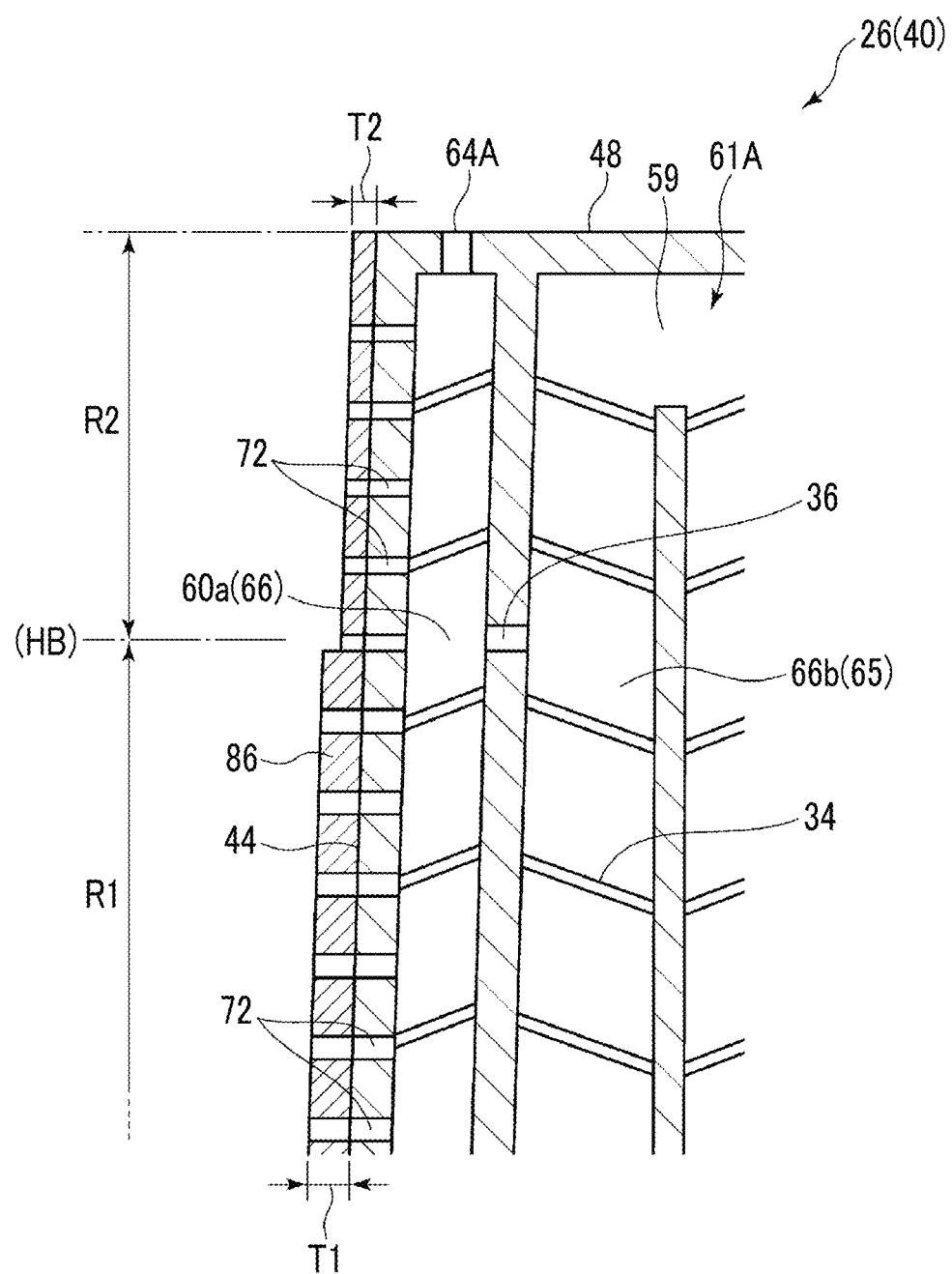
FIG. 10 is a schematic cross-sectional view illustrating an enlarged portion of the turbine blade according to the embodiment on a leading edge side.

Here, specific examples of the parameters will be described. FIG. 4 and FIG. 6 to FIG. 9 are schematic cross-sectional views respectively illustrating an enlarged portion of the turbine blade 40 according to the embodiment on the trailing edge side. FIG. 5 and FIG. 10 are schematic cross-sectional views illustrating an enlarged portion of the turbine blade 40 according to the embodiment on the leading edge side. Note that some parameters will be described using either figures of the portion of the turbine blade 40 (FIG. 6 to FIG. 9) on the trailing edge side or the figure of the portion of the turbine blade 40 (FIG. 10) on the leading edge side. However, the same description can be given for the other portion of the turbine blade 40 on the leading edge side or the trailing edge side.

In some embodiments, the parameter may be a pitch Ph of a pair of cooling holes 70 or 72 in the blade height direction that are adjacent to each other in the blade height direction among the plurality of cooling holes 70 or 72. In some embodiments, for example, as illustrated in FIG. 4 or FIG. 5, a pitch Ph2 of a pair of adjacent cooling holes 70 or 72 in the downstream-side region R2 is larger than a pitch Ph1 of a pair of adjacent cooling holes 70 or 72 in the upstream-side region R1. In this case, diameters of the plurality of cooling holes 70 or 72 arranged along the blade height direction may be the same.

The pitch of a pair of adjacent cooling holes in the blade height direction is a distance between centers of the pair of adjacent cooling holes in the blade height direction.

Figure 6:
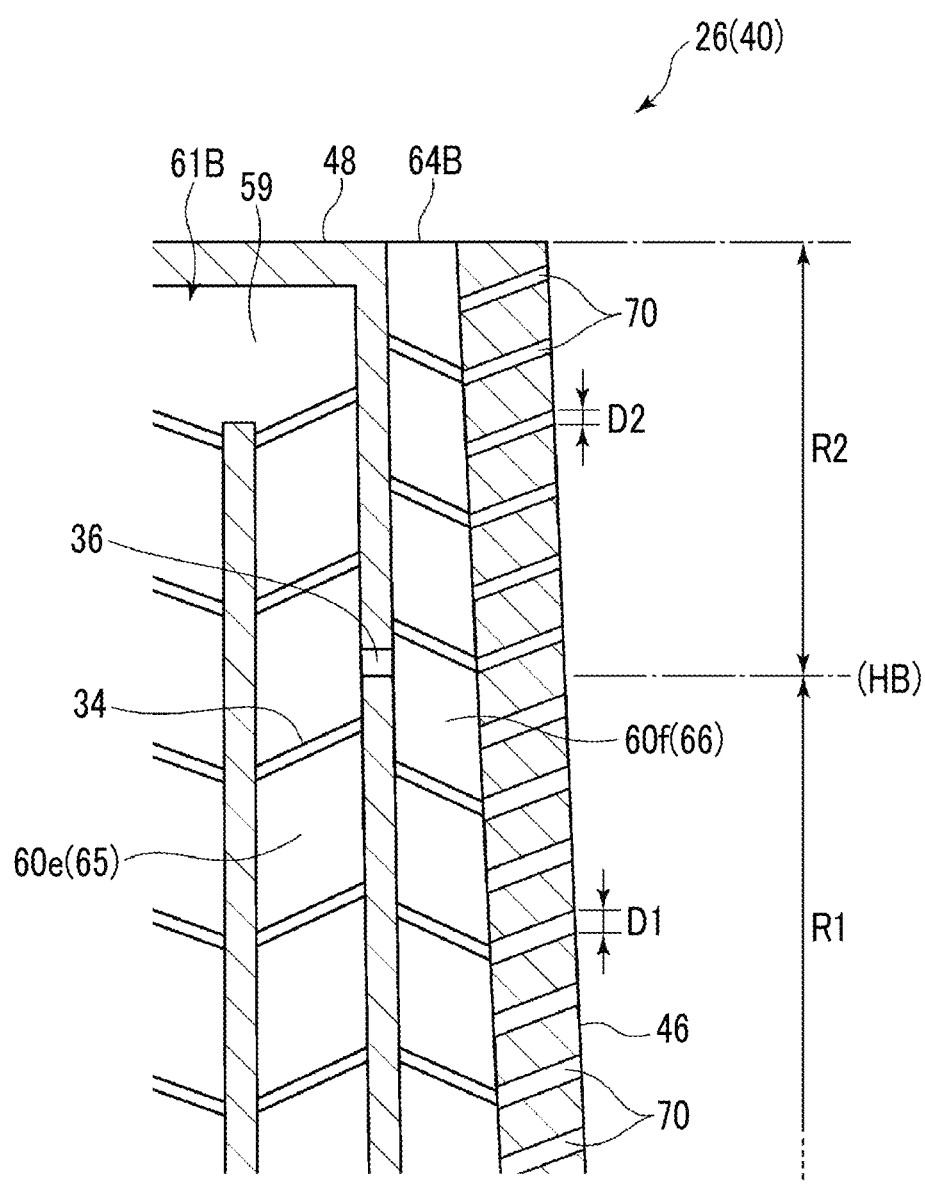
FIG. 6 is a schematic cross-sectional view illustrating an enlarged portion of the turbine blade according to the embodiment on a trailing edge side.

In some embodiments, the parameter may be a diameter D of the plurality of cooling holes 70 or 72. In some embodiments, for example, as illustrated in FIG. 6, a diameter D2 of the plurality of cooling holes 70 or 72 in the downstream-side region R2 is smaller than a diameter D1 of the plurality of cooling holes 70 or 72 in the upstream-side region R1. In this case, the pitches of the plurality of cooling holes 70 or 72 in the blade height direction which are arranged along the blade height direction may be the same.

The diameter of the cooling hole may be an equivalent diameter (hydraulic diameter) of the cooling hole.

In some embodiments, the parameter may be an opening density of the plurality of cooling holes 70 or 72. In some embodiments, the opening density in the downstream-side region R2 is lower than the opening density in the upstream-side region R1.

Here, as the opening density of the plurality of cooling holes, a ratio Ph/D of the pitch Ph of the cooling holes 70 and the diameter D of the cooling holes in the blade height direction may be adopted. Alternatively, a ratio S/Ph of a wetted perimeter S at an opening end of the cooling hole on the surface of the blade body 42 (that is, a circumferential length of the opening end on the surface of the blade body 42) and the pitch Ph of the cooling holes in the blade height direction may be adopted. Alternatively, the number of the cooling holes per unit length of the blade body 42 in the blade height direction may be adopted.

In the above-described embodiment, the pitch Ph of the plurality of cooling holes 70 or 72 in the blade height direction that communicate with the downstream-side passage 66 and that are open to the surface of the blade body 42 is larger in the downstream-side region R2 than in the upstream-side region R1. Alternatively, the diameter D of the plurality of cooling holes 70 or 72 is smaller in the downstream-side region R2 than in the upstream-side region R1. Alternatively, the opening density of the plurality of cooling holes 70 or 72 is lower in the downstream-side region R2 than in the upstream-side region R1.

Therefore, as compared to a case where the pitch Ph, the diameter D, or the opening density is the same in the downstream-side region R2 and the upstream-side region R1, the amount of heat removed from the turbine blade 40 by the cooling fluid in the downstream-side region R2 can be reduced. Alternatively, as compared to a case where the pitch Ph, the diameter D, or the opening density is the same in the downstream-side region R2 and the upstream-side region R1, the amount of heat removed from the turbine blade 40 by the cooling fluid in the upstream-side region R1 can be increased. Therefore, for the blade body 42 in the vicinity of the downstream-side passage 66, it is possible to prevent overcooling in the downstream-side region R2 or insufficient cooling in the upstream-side region R1.

In some embodiments, the parameter may be a surface roughness of inner wall surfaces 71 (refer to FIG. 4) of the plurality of cooling holes 70 or 72. The surface roughness may be an arithmetic average roughness Ra. In some embodiments, the surface roughness of the plurality of cooling holes 70 or 72 in the downstream-side region R2 is smaller than the surface roughness in the upstream-side region R1.

In the above-described embodiment, surface roughness of the inner wall surfaces 71 of the plurality of cooling holes 70 or 72 that communicate with the downstream-side passage 66 and that are open to the surface of the blade body 42 is smaller in the downstream-side region R2 than in the upstream-side region R1. Therefore, as compared to a case where the surface roughness of the inner wall surfaces 71 of the plurality of cooling holes 70 or 72 is the same in the downstream-side region R2 and the upstream-side region R1, the amount of heat removed from the turbine blade 40 by the cooling fluid in the downstream-side region R2 can be reduced. Alternatively, as compared to a case where the surface roughness of the inner wall surfaces 71 of the plurality of cooling holes 70 or 72 is the same in the downstream-side region R2 and the upstream-side region R1, the amount of heat removed from the turbine blade 40 by the cooling fluid in the upstream-side region R1 can be increased. Therefore, for the blade body 42 in the vicinity of the downstream-side passage 66, it is possible to prevent overcooling in the downstream-side region R2 or insufficient cooling in the upstream-side region R1.

In some embodiments, the plurality of turbulators 34 may be provided such that a heat transfer coefficient between the cooling fluid and the inner wall surface 63 of the downstream-side passage 66 is smaller in the downstream-side region R2 than in the upstream-side region R1.

Figure 7:
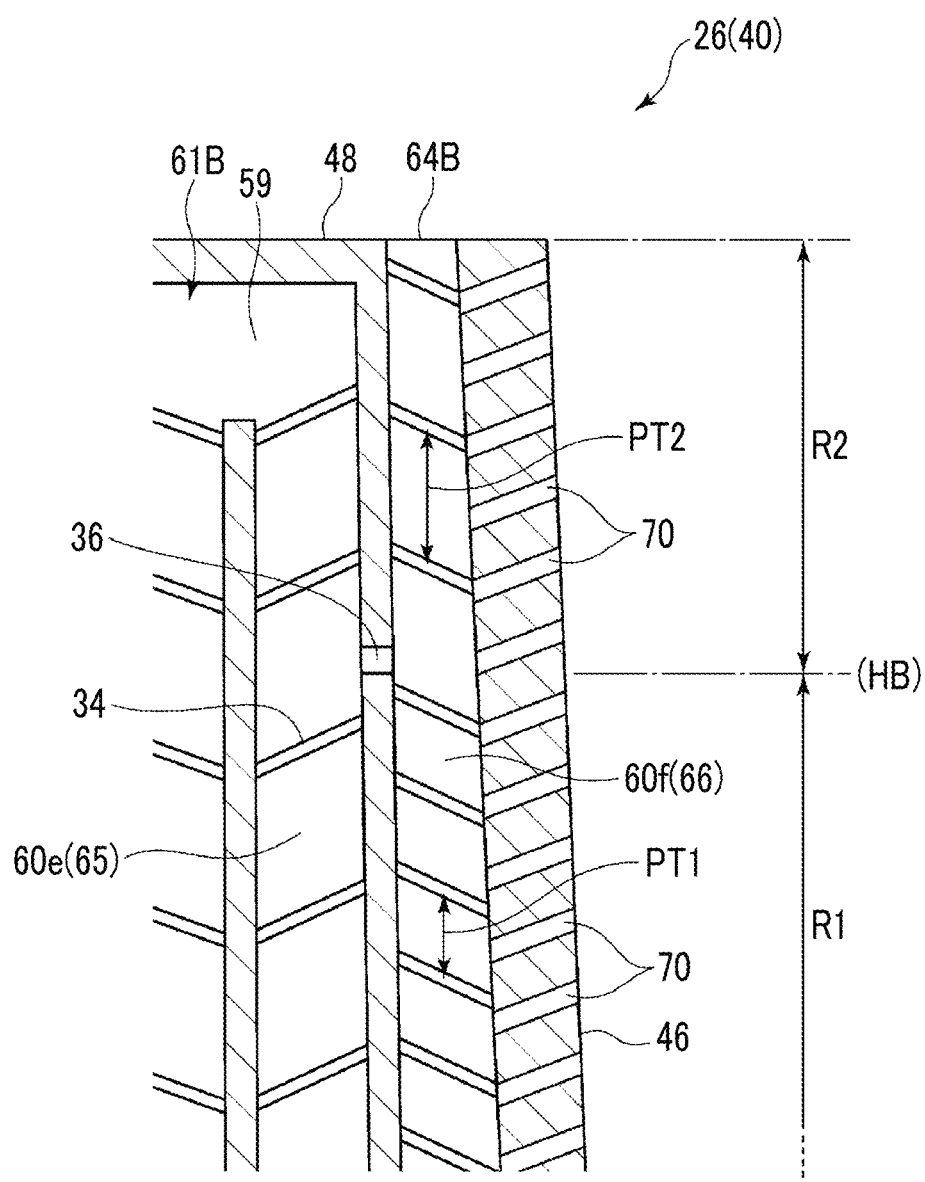
FIG. 7 is a schematic cross-sectional view illustrating an enlarged portion of the turbine blade according to the embodiment on a trailing edge side.

For example, in some embodiments, the parameter may be a pitch PT of the plurality of turbulators 34 in the blade height direction. In some embodiments, for example, as illustrated in FIG. 7, a pitch PT2 of the plurality of turbulators 34 in the downstream-side region R2 is larger than a pitch PT1 of the plurality of turbulators 34 in the upstream-side region R1.

Figure 8:
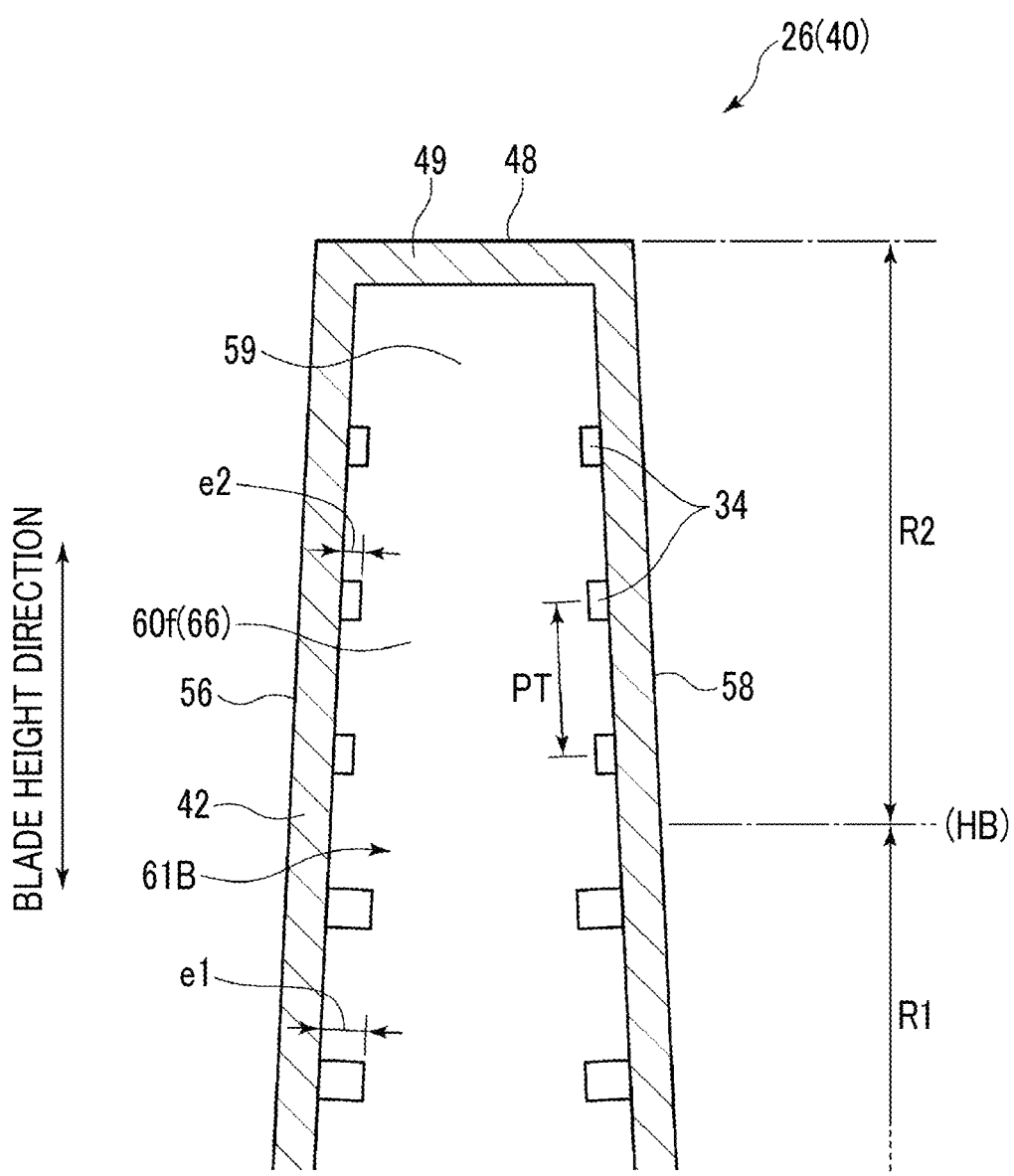
FIG. 8 is a schematic cross-sectional view illustrating an enlarged portion of the turbine blade according to the embodiment on a trailing edge side.
Figure 9:
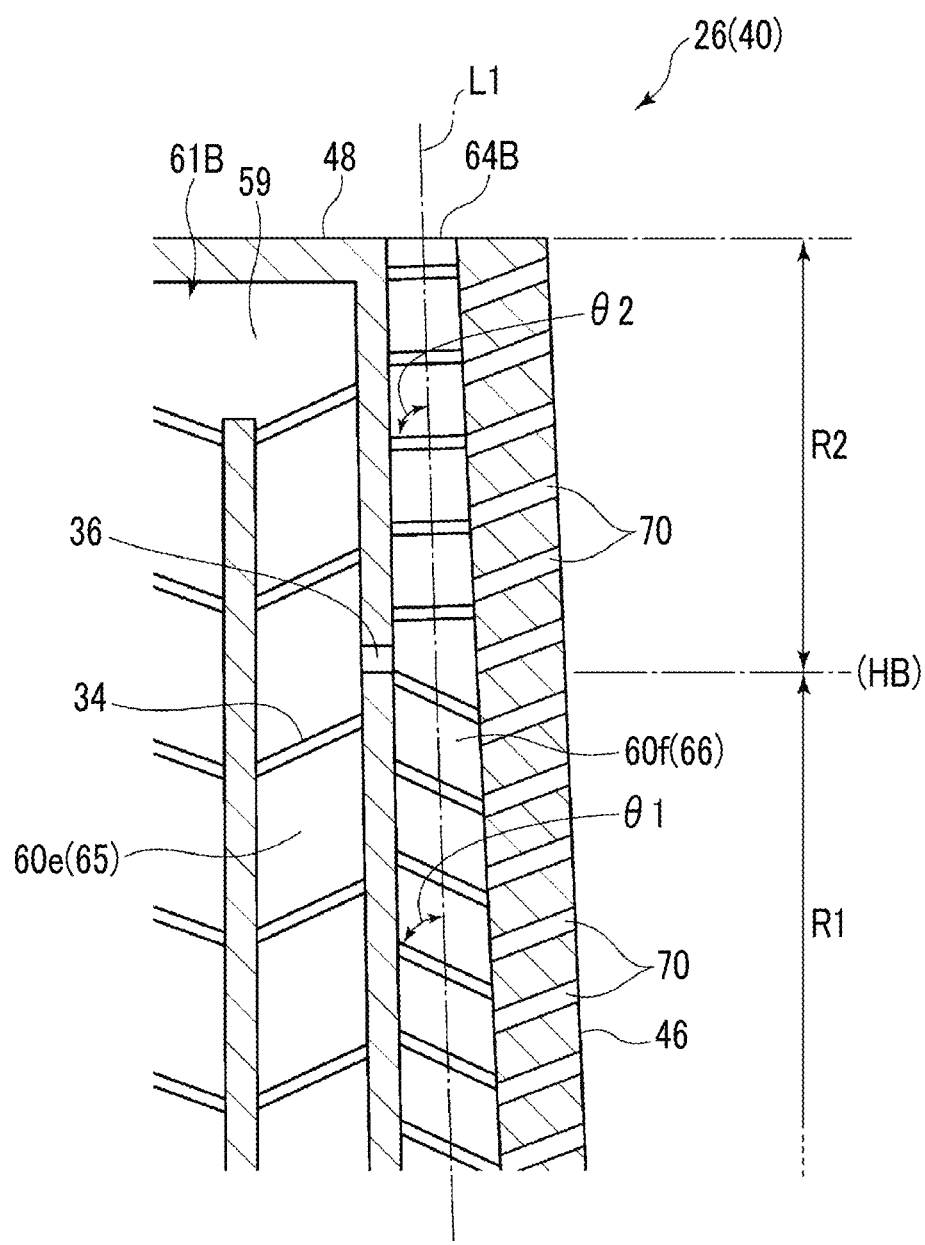
FIG. 9 is a schematic cross-sectional view illustrating an enlarged portion of the turbine blade according to the embodiment on a trailing edge side.

The pitch PT of the turbulators 34 in the blade height direction is a distance in the blade height direction between centers of a pair of turbulators 34 adjacent to each other in the blade height direction (refer to FIG. 8). In a case where heights e of the turbulators 34 are the same, the smaller the pitch PT of the turbulators 34 is, the larger the heat transfer coefficient between the cooling fluid and the turbine blade 40 tends to be.

Further, for example, in some embodiments, the parameter may be the height e of the turbulator 34 with reference to the inner wall surface 63 of the downstream-side passage 66. In some embodiments, for example, as illustrated in FIG. 8, the height e2 of the turbulator 34 in the downstream-side region R2 is lower than the height e1 of the turbulator 34 in the upstream-side region R1.

In a case where the pitch PT of the turbulators 34 is the same, the higher the height e of the turbulator 34 is, the larger the heat transfer coefficient between the cooling fluid and the turbine blade 40 tends to be.

Further, for example, in some embodiments, the parameter is an angle θ between the direction of the flow of the cooling fluid in the downstream-side passage 66 (indicated by a straight line L1 in FIG. 9) and an extending direction of the turbulators 34 (here, θ is equal to or larger than 0 degree and equal to or smaller than 90 degrees, and hereinafter, is also referred to as an inclination angle θ of the turbulator 34). That is, in some embodiments, the inclination angle θ of the turbulator 34 differs between the downstream-side region R2 and the upstream-side region R1.

In the embodiment, the plurality of turbulators 34 arranged along the blade height direction are provided on the inner wall surface 63 of the downstream-side passage 66, and the heat transfer coefficient between the inner wall surface 63 and the cooling fluid is smaller in the downstream-side region R2 than in the upstream-side region R1. For example, a pitch PT2 of the plurality of turbulators 34 in the downstream-side region R2 is larger than a pitch PT1 of the plurality of turbulators 34 in the upstream-side region R1. Alternatively, the height e2 of the turbulator 34 in the downstream-side region R2 is lower than the height e1 of the turbulator 34 in the upstream-side region R1. Alternatively, the inclination angle θ2 of the turbulator 34 in the downstream-side region R2 and the inclination angle θ1 of the turbulator 34 in the upstream-side region R1 are different from each other.

Therefore, as compared to a case where the heat transfer coefficient, the pitch PT of the turbulators 34, the height e of the turbulator 34, or the angle θ of the turbulator 34 is the same in the downstream-side region and the upstream-side region, the amount of heat removed from the turbine blade 40 by the cooling fluid in the downstream-side region R2 can be reduced. Alternatively, as compared to a case where the heat transfer coefficient is the same in the downstream-side region R2 and the upstream-side region R1, the amount of heat removed from the turbine blade 40 by the cooling fluid in the upstream-side region can be increased. Therefore, for the blade body 42 in the vicinity of the downstream-side passage 66, it is possible to prevent overcooling in the downstream-side region R2 or insufficient cooling in the upstream-side region R1.

In some embodiments, the parameter may be a thickness T of the thermal barrier coating 86. In some embodiments, for example, as illustrated in FIG. 10, the thickness T2 of the thermal barrier coating 86 in the downstream-side region R2 is smaller than the thickness T1 of the thermal barrier coating 86 in the upstream-side region R1.

Note that the thickness of the thermal barrier coating 86 may be different as described above only in a partial region of the surface of the turbine blade 40. For example, in a region including the leading edge 44 or the trailing edge 46 located in the vicinity of the downstream-side passage 66 (the cooling passage 60a in FIG. 10) where the bypass portion 36 is provided, as described above, the thickness T2 of the thermal barrier coating 86 in the downstream-side region R2 may be smaller than the thickness T1 of the thermal barrier coating 86 in the upstream-side region R1.

The thickness T of the thermal barrier coating 86 can be adjusted, for example, by changing a moving speed of a thermal spraying gun during application of the thermal barrier coating 86. That is, the faster the moving speed of the thermal spraying gun is, the smaller the thickness of the thermal barrier coating to be formed can be.

In the embodiment, the thickness of the thermal barrier coating 86 covering the surface of the blade body 42 is smaller in the downstream-side region R2 than in the upstream-side region R1. Therefore, as compared to a case where the thickness T of the thermal barrier coating 86 is the same in the downstream-side region R2 and the upstream-side region R1, a metal temperature of the blade body 42 can be made uniform in the blade height direction. Therefore, for the blade body 42 in the vicinity of the downstream-side passage 66, it is possible to prevent overcooling in the downstream-side region R2 or insufficient cooling in the upstream-side region R1.

Figure 11:
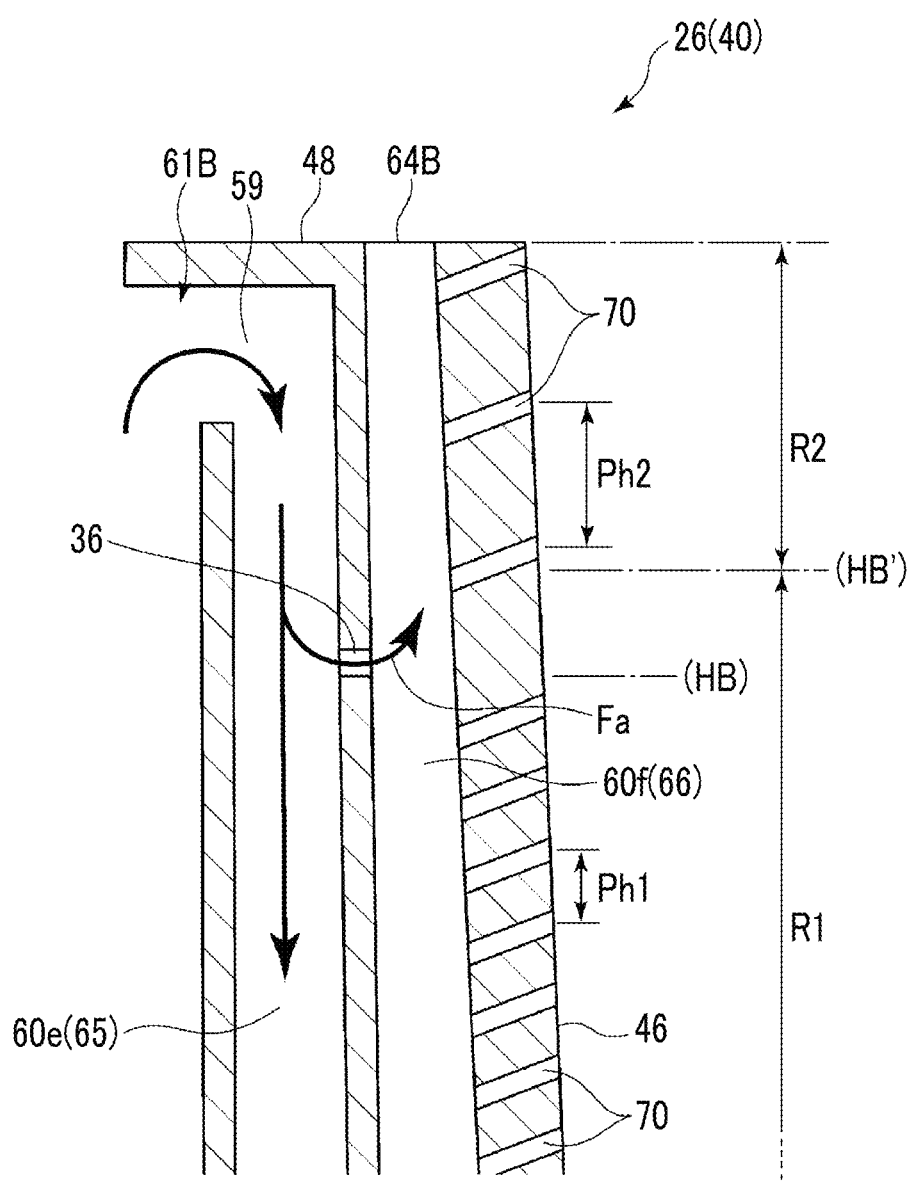
FIG. 11 is a schematic cross-sectional view illustrating an enlarged portion of the turbine blade according to the embodiment on a trailing edge side.

FIG. 11 is a schematic cross-sectional view illustrating an enlarged portion of the turbine blade 40 according to the embodiment on the trailing edge side. In some embodiments, the bypass portion 36 is provided in the partition wall portion 32 for partitioning the cooling passage 60a or 60f (downstream-side passage 66) located closest to the leading edge or closest to the trailing edge among the plurality of cooling passages 60 and the cooling passage 60b or 60e (upstream-side passage 65) adjacent to the cooling passage 60a or 60f. (Note that, in the exemplary embodiment illustrated in FIG. 11, the bypass portion 36 is provided in the partition wall portion 32 for partitioning the cooling passage 60f (downstream-side passage 66) located closest to the trailing edge and the cooling passage 60e (upstream-side passage 65) adjacent to the cooling passage 60f.) Thus, in the upstream-side region R1 and the downstream-side region R2 of which a boundary in the blade height direction is a position HB' on the downstream side of a position HB of the bypass portion 36 (a position corresponding to the bypass portion 36 in the blade height direction) with respect to the flow of the cooling passage in the cooling passage 60a or 60f (downstream-side passage 66), the values of the parameters are different.

The cooling passage 60a or 60f located closest to the leading edge or closest to the trailing edge among the plurality of cooling passages 60 usually has an outlet opening 64A or 64B at a downstream-side end (refer to FIG. 2). In a case where the outlet opening 64 is large, a flow rate of the cooling fluid in the cooling passage 60f increases. In such a case, a direction of the cooling fluid (an arrow Fa in FIG. 11) flowing from the upstream-side passage 65 to the downstream-side passage 66 via the bypass portion 36 is largely bent to the downstream side, and the cooling fluid is supplied to a position on the downstream side of the bypass portion 36 in the downstream-side passage 66.

In this regard, in the embodiment, a position where the values of the parameters indicating the characteristics of the plurality of cooling holes 70 or 72, the plurality of turbulators 34, or the thermal barrier coating 86 are changed is provided on the downstream side of the bypass portion 36. Therefore, even in a case where the direction of the cooling fluid flowing to the downstream-side passage 66 is significantly bent to the downstream side as described above, between a region (upstream-side region R1) on the upstream side of the downstream-side position HB' of the bypass portion 36 (position corresponding to the bypass portion 36) and a region (downstream-side region R2) on the downstream side of the downstream-side position HB' of the bypass portion 36, it is possible to make a difference in the amount of heat removed from the turbine blade 40 by the cooling fluid or in the amount of heat input to the turbine blade 40 from the gas flowing through the combustion gas passage 28 in which the turbine blade 40 is disposed. Thereby, for the blade body 42 in the vicinity of the downstream-side passage 66, it is possible to effectively prevent overcooling in the downstream-side region R2 or insufficient cooling in the upstream-side region R1.

For example, the content described in each embodiment is understood as follows.

(1) According to at least one embodiment of the present invention, there is provided a turbine blade (40) including: a blade body (42); a plurality of cooling passages (60) that extend along a blade height direction inside the blade body and that are connected to each other via a folded portion (59); and a bypass portion (36) that is provided in a partition wall portion (32) for partitioning a pair of adjacent cooling passages among the plurality of cooling passages and that allows the pair of cooling passages to communicate with each other, in which the pair of cooling passages includes an upstream-side passage (65) and a downstream-side passage (66) located on a downstream side of the upstream-side passage with respect to a flow of a cooling fluid, the turbine blade includes a plurality of cooling holes (70 or 72), a plurality of turbulators (34), or a thermal barrier coating (86) that covers a surface of the blade body, the plurality of cooling holes (70 or 72) being formed in the blade body so as to be arranged along the blade height direction, communicating with the downstream-side passage, and being open to a surface of the blade body, and the plurality of turbulators (34) being provided on an inner wall surface (63) of the downstream-side passage and arranged along the blade height direction, and values of parameters indicating characteristics of the plurality of cooling holes, the plurality of turbulators, or the thermal barrier coating are different between an upstream-side region (R1) and a downstream-side region (R2), the upstream-side region (R1) being located on an upstream side of a position corresponding to the bypass portion in the blade height direction with respect to the flow of the cooling fluid in the downstream-side passage, and the downstream-side region (R2) being located on a downstream side of the upstream-side region with respect to the flow of the cooling fluid in the downstream-side passage.

With the configuration according to (1), the upstream-side passage and the downstream-side passage which are adjacent to each other communicate with each other via the bypass portion. Thus, the cooling fluid having a relatively low temperature before the temperature rises can be supplied to the region (the downstream-side region) on the downstream side of the bypass portion in the downstream-side passage. Therefore, the blade body in the vicinity of the downstream-side region can be effectively cooled.

Further, with the configuration according to (1), between the region (upstream-side region) on the upstream side of the bypass portion and the region (downstream-side region) on the downstream side of the bypass portion in the downstream-side passage, values of the parameters indicating characteristics of the plurality of cooling holes, the plurality of turbulators, or the thermal barrier coating are different. Therefore, between the upstream-side region and the downstream-side region in the downstream-side passage, it is possible to make a difference in the amount of heat removed from the turbine blade by the cooling fluid or in the amount of heat input to the turbine blade from the gas (the combustion gas or the like) flowing through the gas passage in which the turbine blade is disposed. Therefore, for the blade body in the vicinity of the downstream-side passage, it is possible to prevent overcooling in the downstream-side region or insufficient cooling in the upstream-side region.

That is, with the configuration according to (1), by providing the bypass portion, the turbine blade can be effectively cooled, and overcooling or insufficient cooling of the turbine blade due to provision of the bypass portion can be prevented.

(2) In some embodiments, in the configuration according to (1), the turbine blade includes a plurality of cooling holes (70 or 72) that are formed in the blade body so as to be arranged along the blade height direction, communicate with the downstream-side passage, and that are open to a surface of the blade body, and an opening density of the plurality of cooling holes is lower in the downstream-side region than in the upstream-side region.

With the configuration according to (2), the opening density of the plurality of cooling holes that communicate with the downstream-side passage and that are open to the surface of the blade body is lower in the downstream-side region than in the upstream-side region. Therefore, as compared to a case where the opening density is the same in the downstream-side region and the upstream-side region, the amount of heat removed from the turbine blade by the cooling fluid in the downstream-side region can be reduced. Alternatively, as compared to a case where the opening density is the same in the downstream-side region and the upstream-side region, the amount of heat removed from the turbine blade by the cooling fluid in the upstream-side region can be increased. Therefore, for the blade body in the vicinity of the downstream-side passage, it is possible to prevent overcooling in the downstream-side region or insufficient cooling in the upstream-side region.

(3) In some embodiments, in the configuration according to (1) or (2), the turbine blade includes a plurality of cooling holes that are formed in the blade body so as to be arranged along the blade height direction, communicate with the downstream-side passage, and that are open to a surface of the blade body, and a pitch (Ph) of a pair of cooling holes in the blade height direction is larger in the downstream-side region than in the upstream-side region, the pair of cooling holes being adjacent to each other in the blade height direction.

With the configuration according to (3), the pitch of the plurality of cooling holes that communicate with the downstream-side passage and that are open to the surface of the blade body in the blade height direction is larger in the downstream-side region than in the upstream-side region. Therefore, as compared to a case where the pitch of the plurality of cooling holes is the same in the downstream-side region and the upstream-side region, the amount of heat removed from the turbine blade by the cooling fluid in the downstream-side region can be reduced. Alternatively, as compared to a case where the pitch of the plurality of cooling holes is the same in the downstream-side region and the upstream-side region, the amount of heat removed from the turbine blade by the cooling fluid in the upstream-side region can be increased. Therefore, for the blade body in the vicinity of the downstream-side passage, it is possible to prevent overcooling in the downstream-side region or insufficient cooling in the upstream-side region.

(4) In some embodiments, in the configuration according to any one of (1) to (3), the turbine blade includes a plurality of cooling holes that are formed in the blade body so as to be arranged along the blade height direction, communicate with the downstream-side passage, and that are open to a surface of the blade body, and a diameter (D) of the plurality of cooling holes is smaller in the downstream-side region than in the upstream-side region.

With the configuration according to (4), the diameter of the plurality of cooling holes that communicate with the downstream-side passage and that are open to the surface of the blade body is smaller in the downstream-side region than in the upstream-side region. Therefore, as compared to a case where the diameter of the plurality of cooling holes is the same in the downstream-side region and the upstream-side region, the amount of heat removed from the turbine blade by the cooling fluid in the downstream-side region can be reduced. Alternatively, as compared to a case where the diameter of the plurality of cooling holes is the same in the downstream-side region and the upstream-side region, the amount of heat removed from the turbine blade by the cooling fluid in the upstream-side region can be increased. Therefore, for the blade body in the vicinity of the downstream-side passage, it is possible to prevent overcooling in the downstream-side region or insufficient cooling in the upstream-side region.

(5) In some embodiments, in the configuration according to any one of (1) to (4), the turbine blade includes a plurality of cooling holes that are formed in the blade body so as to be arranged along the blade height direction, communicate with the downstream-side passage, and that are open to a surface of the blade body, and a surface roughness of inner wall surfaces of the plurality of cooling holes is smaller in the downstream-side region than in the upstream-side region.

With the configuration according to (5), the surface roughness of the inner wall surfaces of the plurality of cooling holes that communicate with the downstream-side passage and that are open to the surface of the blade body is smaller in the downstream-side region than in the upstream-side region. Therefore, as compared to a case where the surface roughness of the inner wall surfaces of the plurality of cooling holes is the same in the downstream-side region and the upstream-side region, the amount of heat removed from the turbine blade by the cooling fluid in the downstream-side region can be reduced. Alternatively, as compared to a case where the surface roughness of the inner wall surfaces of the plurality of cooling holes is the same in the downstream-side region and the upstream-side region, the amount of heat removed from the turbine blade by the cooling fluid in the upstream-side region can be increased. Therefore, for the blade body in the vicinity of the downstream-side passage, it is possible to prevent overcooling in the downstream-side region or insufficient cooling in the upstream-side region.

(6) In some embodiments, in the configuration according to any one of (1) to (5), the turbine blade includes a plurality of turbulators (34) that are provided on an inner wall surface (63) of the downstream-side passage and arranged along the blade height direction, and the plurality of turbulators are provided such that a heat transfer coefficient between the cooling fluid and the inner wall surface of the downstream-side passage is smaller in the downstream-side region than in the upstream-side region.

With the configuration according to (6), the plurality of turbulators arranged along the blade height direction are provided on the inner wall surface of the downstream-side passage, and the heat transfer coefficient between the inner wall surface and the cooling fluid is smaller in the downstream-side region than in the upstream-side region. Therefore, as compared to a case where the heat transfer coefficient is the same in the downstream-side region and the upstream-side region, the amount of heat removed from the turbine blade by the cooling fluid in the downstream-side region can be reduced. Alternatively, as compared to a case where the heat transfer coefficient is the same in the downstream-side region and the upstream-side region, the amount of heat removed from the turbine blade by the cooling fluid in the upstream-side region can be increased.

Therefore, for the blade body in the vicinity of the downstream-side passage, it is possible to prevent overcooling in the downstream-side region or insufficient cooling in the upstream-side region.

(7) In some embodiments, in the configuration according to any one of (1) to (6), the turbine blade includes a plurality of turbulators that are provided on an inner wall surface of the downstream-side passage and arranged along the blade height direction, and a pitch (PT) of the plurality of turbulators in the blade height direction is larger in the downstream-side region than in the upstream-side region.

With the configuration according to (7), the plurality of turbulators arranged along the blade height direction are provided on the inner wall surface of the downstream-side passage, and the pitch of the plurality of turbulators in the blade height direction is larger in the downstream-side region than in the upstream-side region. Therefore, as compared to a case where the pitch of the plurality of turbulators is the same in the downstream-side region and the upstream-side region, the amount of heat removed from the turbine blade by the cooling fluid in the downstream-side region can be reduced. Alternatively, as compared to a case where the pitch of the plurality of turbulators is the same in the downstream-side region and the upstream-side region, the amount of heat removed from the turbine blade by the cooling fluid in the upstream-side region can be increased. Therefore, for the blade body in the vicinity of the downstream-side passage, it is possible to prevent overcooling in the downstream-side region or insufficient cooling in the upstream-side region.

(8) In some embodiments, in the configuration according to any one of (1) to (7), the turbine blade includes a plurality of turbulators that are provided on an inner wall surface of the downstream-side passage and arranged along the blade height direction, and a height (e) of the turbulators with reference to the inner wall surface of the downstream-side passage is lower in the downstream-side region than in the upstream-side region.

With the configuration according to (8), the plurality of turbulators arranged along the blade height direction are provided on the inner wall surface of the downstream-side passage, and the height of the turbulators with reference to the inner wall surface is lower in the downstream-side region than in the upstream-side region. Therefore, as compared to a case where the height of the turbulators is the same in the downstream-side region and the upstream-side region, the amount of heat removed from the turbine blade by the cooling fluid in the downstream-side region can be reduced. Alternatively, as compared to a case where the height of the turbulators is the same in the downstream-side region and the upstream-side region, the amount of heat removed from the turbine blade by the cooling fluid in the upstream-side region can be increased. Therefore, for the blade body in the vicinity of the downstream-side passage, it is possible to prevent overcooling in the downstream-side region or insufficient cooling in the upstream-side region.

(9) In some embodiments, in the configuration according to any one of (1) to (8), the turbine blade includes a plurality of turbulators that are provided on an inner wall surface of the downstream-side passage and arranged along the blade height direction, and an angle ($\theta$) between a direction of the flow of the cooling fluid in the downstream-side passage and an extending direction of the turbulators is different in the downstream-side region and the upstream-side region.

With the configuration according to (9), the plurality of turbulators arranged along the blade height direction are provided on the inner wall surface of the downstream-side passage, and the angle between a direction of the flow of the cooling fluid in the downstream-side passage and an extending direction of the turbulators is different in the downstream-side region and the upstream-side region. Therefore, as compared to a case where the angle is the same in the downstream-side region and the upstream-side region, the amount of heat removed from the turbine blade by the cooling fluid in the downstream-side region can be reduced. Alternatively, as compared to a case where the angle is the same in the downstream-side region and the upstream-side region, the amount of heat removed from the turbine blade by the cooling fluid in the upstream-side region can be increased. Therefore, for the blade body in the vicinity of the downstream-side passage, it is possible to prevent overcooling in the downstream-side region or insufficient cooling in the upstream-side region.

(10) In some embodiments, in the configuration according to any one of (1) to (9), the turbine blade includes a thermal barrier coating (86) that covers a surface of the blade body, and a thickness (T) of the thermal barrier coating is smaller in the downstream-side region than in the upstream-side region.

With the configuration according to (10), the thickness of the thermal barrier coating that covers the surface of the blade body is smaller in the downstream-side region than in the upstream-side region. Therefore, as compared to a case where the thickness of the thermal barrier coating is the same in the downstream-side region and the upstream-side region, a metal temperature of the blade body can be made uniform in the blade height direction. Therefore, for the blade body in the vicinity of the downstream-side passage, it is possible to prevent overcooling in the downstream-side region or insufficient cooling in the upstream-side region.

(11) In some embodiments, in the configuration according to any one of (1) to (10), the downstream-side passage is a cooling passage (60a) located closest to a leading edge side or a cooling passage (60f) located closest to a trailing edge side in a chord direction of the blade body among the plurality of cooling passages, and the position corresponding to the bypass portion in the blade height direction is located on a downstream side of the bypass portion with respect to the flow of the cooling fluid in the downstream-side passage.

In a case where the flow rate of the cooling fluid increases in the cooling passage located closest to the leading edge or closest to the trailing edge, a direction of the cooling fluid flowing from the upstream-side passage to the downstream-side passage via the bypass portion is largely bent to the downstream side, and the cooling fluid is supplied to a position on the downstream side of the bypass portion in the downstream-side passage. In this regard, with the configuration according to (11), a position where the values of the parameters indicating the characteristics of the plurality of cooling holes, the plurality of turbulators, or the thermal barrier coating are changed is provided on the downstream side of the bypass portion. Therefore, even in a case where the direction of the cooling fluid flowing to the downstream-side passage is significantly bent to the downstream side as described above, between a region (upstream-side region) on the upstream side of the downstream-side position of the bypass portion (position corresponding to the bypass portion) and a region (downstream-side region) on the downstream side of the downstream-side position of the bypass portion, it is possible to make a difference in the amount of heat removed from the turbine blade by the cooling fluid or in the amount of heat input to the turbine blade from the gas flowing through the gas passage in which the turbine blade 40 is disposed. Thereby, for the blade body in the vicinity of the downstream-side passage, it is possible to effectively prevent overcooling in the downstream-side region or insufficient cooling in the upstream-side region.

(12) According to at least one embodiment of the present invention, there is provided a gas turbine (1) including: the turbine blade (40) according to any one of (1) to (11); and a combustor (4) that generates a combustion gas flowing through a combustion gas flow path in which the turbine blade is provided.

With the configuration according to (12), the upstream-side passage and the downstream-side passage which are adjacent to each other communicate with each other via the bypass portion. Thus, the cooling fluid having a relatively low temperature before the temperature rises can be supplied to the region (the downstream-side region) on the downstream side of the bypass portion in the downstream-side passage. Therefore, the blade body in the vicinity of the downstream-side region can be effectively cooled.

Further, with the configuration according to (12), between the region (upstream-side region) on the upstream side of the bypass portion and the region (downstream-side region) on the downstream side of the bypass portion in the downstream-side passage, values of the parameters indicating characteristics of the plurality of cooling holes, the plurality of turbulators, or the thermal barrier coating are different. Therefore, between the upstream-side region and the downstream-side region in the downstream-side passage, it is possible to make a difference in the amount of heat removed from the turbine blade by the cooling fluid or in the amount of heat input to the turbine blade from the gas (the combustion gas or the like) flowing through the gas passage in which the turbine blade is disposed. Therefore, for the blade body in the vicinity of the downstream-side passage, it is possible to prevent overcooling in the downstream-side region or insufficient cooling in the upstream-side region.

That is, with the configuration according to (12), by providing the bypass portion, the turbine blade can be effectively cooled, and overcooling or insufficient cooling of the turbine blade due to provision of the bypass portion can be prevented.

Although the embodiments of the present invention have been described, the present invention is not limited to the above-described embodiments, and includes modifications of the above-described embodiments and a combination of these embodiments as appropriate.

In the present specification, an expression representing a relative or absolute arrangement such as "in a certain direction", "along a certain direction", "parallel", "orthogonal", "center", "concentric", or "coaxial" not strictly represent only such an arrangement, but also a tolerance or a state of being relatively displaced with an angle or a distance to the extent that the same function can be obtained.

For example, expressions such as "identical", "equal", and "homogeneous" indicating that things are in an equal state do not strictly represent only the equal state, but also a tolerance or a state where there is a difference to the extent that the same function can be obtained.

In addition, in the present specification, an expression representing a shape such as a quadrangular shape or a cylindrical shape does not represent only a shape such as a quadrangular shape or a cylindrical shape in a geometrically strict sense, but also a shape including an uneven portion, a chamfered portion, and the like within a range in which the same effect can be obtained.

In addition, in the present specification, expressions such as "comprising", "including", or "having" one component are not exclusive expressions excluding the presence of other components.

REFERENCE SIGNS LIST

1: gas turbine
2: compressor
4: combustor
6: turbine
8: rotor
10: compressor casing
12: air intake port
16: stator vane
18: rotor blade
20: casing
22: turbine casing
24: stator vane
26: rotor blade
28: combustion gas passage
30: exhaust chamber
32: partition wall portion
34: turbulator
36: bypass portion
40: turbine blade
42: blade body
44: leading edge
46: trailing edge
47: trailing edge portion
48: tip end
49: top plate
50: base end
56: pressure surface
58: suction surface
59: folded portion
60, 60a to 60f: cooling passage
61, 61A, 61B: serpentine passage 63: inner wall surface
64, 64A, 64B: outlet opening
65: upstream-side passage
66: downstream-side passage
70: cooling hole
71: inner wall surface
72: cooling hole
80: Platform
82: blade root portion
84A: internal cooling passage
84B: internal cooling passage
86: thermal barrier coating
PT: pitch of turbulators
Ph: pitch of cooling holes
R1: upstream-side region
R2: downstream-side region
T: thickness
e: height
θ: angle (inclination angle)

The invention claimed is:

1. A turbine blade comprising:
a blade body;
a plurality of cooling passages that extend along a blade height direction inside the blade body and are connected to each other via a folded portion; and
a bypass portion that is provided in a partition wall portion for partitioning a pair of adjacent cooling passages among the plurality of cooling passages and allows the pair of cooling passages to communicate with each other, wherein
the pair of cooling passages includes an upstream-side passage and a downstream-side passage located on a downstream side of the upstream-side passage with respect to a flow of a cooling fluid,
the turbine blade includes a plurality of cooling holes, the plurality of cooling holes being formed in the blade body so as to be arranged along the blade height direction, communicating with the downstream-side passage, and being open to a surface of the blade body,
values of parameters indicating characteristics of the plurality of cooling holes are different between an upstream-side region and a downstream-side region, the upstream-side region being located on an upstream side of a position corresponding to the bypass portion in the blade height direction with respect to the flow of the cooling fluid in the downstream-side passage, and the downstream-side region being located on a downstream side of the upstream-side region with respect to the flow of the cooling fluid in the downstream-side passage, and
at least one of the following conditions (i) to (iv) is satisfied:
(i) an opening density of the plurality of cooling holes is lower in the downstream-side region than in the upstream-side region;
(ii) a pitch of a pair of cooling holes in the blade height direction is larger in the downstream-side region than in the upstream-side region, the pair of cooling holes being adjacent to each other in the blade height direction;
(iii) a diameter of the plurality of cooling holes is smaller in the downstream-side region than in the upstream-side region; and
(iv) surface roughness of inner wall surfaces of the plurality of cooling holes is smaller in the downstream-side region than in the upstream-side region.

2. The turbine blade according to claim 1, wherein the turbine blade includes a plurality of turbulators that are provided on an inner wall surface of the downstream-side passage and arranged along the blade height direction, and
an angle between a direction of the flow of the cooling fluid in the downstream-side passage and an extending direction of the turbulators is different in the downstream-side region and the upstream-side region.

3. The turbine blade according to claim 1, wherein the downstream-side passage is a cooling passage located closest to a leading edge side or closest to a trailing edge side in a chord direction of the blade body among the plurality of cooling passages, and
the position corresponding to the bypass portion in the blade height direction is located on a downstream side of the bypass portion with respect to the flow of the cooling fluid in the downstream-side passage.

4. A gas turbine comprising:
the turbine blade according to claim 1; and
a combustor that generates a combustion gas flowing through a combustion gas passage in which the turbine blade is provided.

5. A turbine blade comprising:
a blade body;
a plurality of cooling passages that extend along a blade height direction inside the blade body and are connected to each other via a folded portion; and
a bypass portion that is provided in a partition wall portion for partitioning a pair of adjacent cooling passages among the plurality of cooling passages and allows the pair of cooling passages to communicate with each other, wherein
the pair of cooling passages includes an upstream-side passage and a downstream-side passage located on a downstream side of the upstream-side passage with respect to a flow of a cooling fluid,
the turbine blade includes a plurality of turbulators, the plurality of turbulators being provided on an inner wall surface of the downstream-side passage and arranged along the blade height direction,
values of parameters indicating characteristics of the plurality of turbulators are different between an upstream-side region and a downstream-side region, the upstream-side region being located on an upstream side of a position corresponding to the bypass portion in the blade height direction with respect to the flow of the cooling fluid in the downstream-side passage, and the downstream-side region being located on a downstream side of the upstream-side region with respect to the flow of the cooling fluid in the downstream-side passage, and
at least one of the following conditions (i) to (iii) is satisfied:
(i) the plurality of turbulators are provided such that a heat transfer coefficient between the cooling fluid and the inner wall surface of the downstream-side passage is smaller in the downstream-side region than in the upstream-side region;
(ii) a pitch of the plurality of turbulators in the blade height direction is larger in the downstream-side region than in the upstream-side region; and
(iii) a height of the turbulators with reference to the inner wall surface of the downstream-side passage is lower in the downstream-side region than in the upstream-side region.

6. A gas turbine comprising:
the turbine blade according to claim 5; and a combustor that generates a combustion gas flowing through a combustion gas passage in which the turbine blade is provided.

7. A turbine blade comprising:

a blade body;

a plurality of cooling passages that extend along a blade height direction inside the blade body and are connected to each other via a folded portion; and a bypass portion that is provided in a partition wall portion for partitioning a pair of adjacent cooling passages among the plurality of cooling passages and allows the pair of cooling passages to communicate with each other, wherein the pair of cooling passages includes an upstream-side passage and a downstream-side passage located on a downstream side of the upstream-side passage with respect to a flow of a cooling fluid, the turbine blade includes a thermal barrier coating that covers a surface of the blade body, values of parameters indicating characteristics of the plurality of cooling holes are different between an upstream-side region and a downstream-side region, the upstream-side region being located on an upstream side of a position corresponding to the bypass portion in the blade height direction with respect to the flow of the cooling fluid in the downstream-side passage, and the downstream-side region being located on a downstream side of the upstream-side region with respect to the flow of the cooling fluid in the downstream-side passage, and a thickness of the thermal barrier coating is smaller in the downstream-side region than in the upstream-side region.

8. A gas turbine comprising:

the turbine blade according to claim 7; and a combustor that generates a combustion gas flowing through a combustion gas passage in which the turbine blade is provided.

* * * * *